United States Patent
Mu et al.

(10) Patent No.: US 7,955,178 B2
(45) Date of Patent: Jun. 7, 2011

(54) POWER TRANSMISSION DAMPER FOR A TORQUE LIMITER

(75) Inventors: Cheng Mu, Toronto (CA); Jaroslaw Lutoslawski, Scarborough (CA); Richard D. Muizelaar, Mississauga (CA); Fuzheng Hu, Toronto (CA)

(73) Assignee: MAGNA Powertrain, Inc., Concord, ON (CA)

( * ) Notice: Subject to any disclaimer, the term of this patent is extended or adjusted under 35 U.S.C. 154(b) by 400 days.

(21) Appl. No.: 12/278,868

(22) PCT Filed: Feb. 16, 2007

(86) PCT No.: PCT/CA2007/000239
§ 371 (c)(1),
(2), (4) Date: Aug. 8, 2008

(87) PCT Pub. No.: WO2007/093058
PCT Pub. Date: Aug. 23, 2007

(65) Prior Publication Data
US 2009/0090593 A1    Apr. 9, 2009

Related U.S. Application Data

(60) Provisional application No. 60/773,981, filed on Feb. 16, 2006.

(51) Int. Cl.
*F16F 15/121* (2006.01)

(52) U.S. Cl. .................................. 464/68.92; 464/68.1

(58) Field of Classification Search .................. 464/46, 464/68.1, 68.41, 68.8, 68.92, 67.1, 66.1
See application file for complete search history.

(56) References Cited

U.S. PATENT DOCUMENTS

| | | | | |
|---|---|---|---|---|
| 1,495,633 | A | * | 5/1924 | Dutes .......................... 464/67.1 |
| 4,690,660 | A | * | 9/1987 | Hashimoto ................ 464/68.92 |
| 5,996,761 | A |   | 12/1999 | Teramae |
| 6,047,804 | A |   | 4/2000 | Feldhaus et al. |
| 6,575,838 | B2 |   | 6/2003 | Jackel et al. |
| 6,602,140 | B2 | * | 8/2003 | Jee ............................. 464/68.92 |
| 6,675,457 | B1 |   | 1/2004 | Redmond et al. |
| 6,699,132 | B2 |   | 3/2004 | Friedmann et al. |
| 6,708,810 | B2 |   | 3/2004 | Uehara |
| 2004/0185940 | A1 | * | 9/2004 | Yamamoto et al. |

* cited by examiner

*Primary Examiner* — Greg Binda
(74) *Attorney, Agent, or Firm* — Harness, Dickey & Pierce, P.L.C.

(57) ABSTRACT

A damper assembly has a torque input member configured to be connected to engine crankshaft through a torque limit clutch. An output member has a hub configured to be mounted to a transmission input shaft. Damping springs operatively interconnects the input member and output member, enabling the input member and output member to rotate relative to each other at some angular displacements before the input torque from engine crankshaft is completely transmitted to transmission input shaft. The damping springs includes a series of long springs and a series of relatively short spring. The long springs compress before the short compress as the input member rotates relative to the output member.

12 Claims, 5 Drawing Sheets

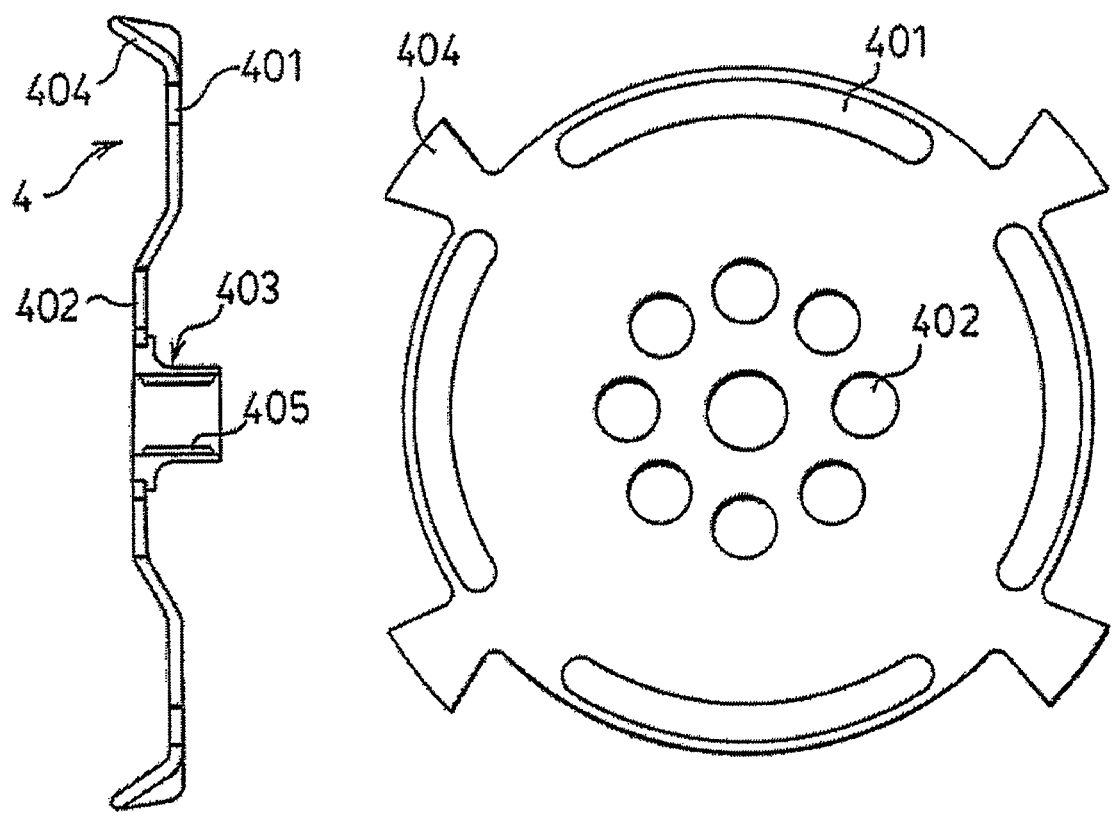

POWER TRANSMISSION DAMPER FOR A TORQUE LIMITER

CROSS-REFERENCE TO RELATED APPLICATIONS

This application is the national phase under 35 U.S.C. §371 of PCT International Application No. PCT/CA2007/000239, filed Feb. 16, 2007, which claims the benefit of U.S. Provisional Application No. 60/773,981, filed Feb. 16, 2006. The entire disclosures of each of the above applications are incorporated herein by reference.

FIELD OF THE INVENTION

The present invention relates to a power transmission damper for a torque limiter.

BACKGROUND OF THE INVENTION

In a vehicle power train system, a damping device, or damper, is needed to transmit power from an engine to a vehicle transmission. The basic function of a damper is to reduce torsional vibration and noise. This is particularly important in a vehicle with a hybrid power system. The damper is of great importance since the large motor inertia may cause excessive impact load being transmitted back to engine and cause engine failure.

Currently there are many designs in which curved coil springs are used to produce damping effect. An example of a current production damper is described in commonly assigned U.S. Pat. No. 6,675,457. The problem with current dampers is that the curved coil springs are expensive to make, leading to a final damper assembly with high costs.

In other designs, straight coil springs are utilized in a spring damping device. In these designs, springs have to be arranged very close to the rotation axial. Such an arrangement reduce torque moment arm radius, leading to a greater load force to be exerted to the springs, which may reduce spring fatigue life. In order to reduce spring loads and to improve fatigue life of springs, the springs have to be arranged to be close to damper outside diameter to maximize torque arm radius.

SUMMARY OF THE INVENTION

The disadvantages of the prior art may be overcome by providing a power transmission damper that obviates at least one disadvantage of the prior art.

According one aspect of the invention, there is provided a damper assembly that has a torque input member configured to be connected to engine crankshaft through a torque limit clutch. An output member has a hub configured to be mounted to a transmission input shaft. Damping springs operatively interconnects the input member and output member, enabling the input member and output member to rotate relative to each other at some angular displacements before the input torque from engine crankshaft is completely transmitted to transmission input shaft. The damping springs includes a series of springs and an individual spring. The series of springs compress before the individual spring compresses as the input member rotates relative to the output member.

Other aspects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings:

FIG. 4 is a side sectional view of the friction plate of the damper assembly of FIG. 1;

FIG. 5 is top plan view of the output member of the damper assembly of FIG. 1;

FIG. 6 is a side sectional view of output member of the damper assembly of FIG. 1;

DESCRIPTION OF ILLUSTRATED EMBODIMENT

Figure 1:
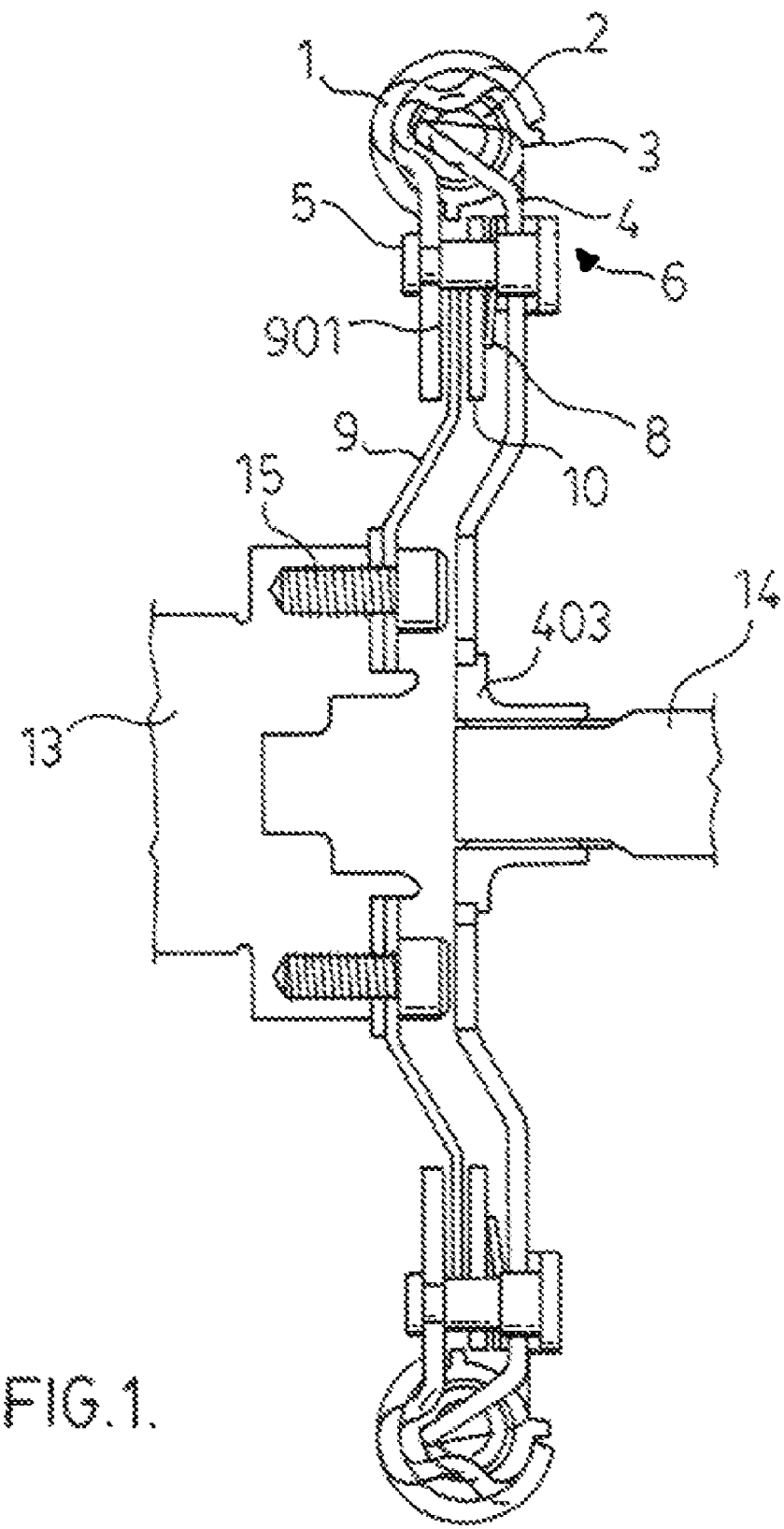
FIG. 1 is an elevational section view of a damper assembly according to the present invention.
Figure 2:
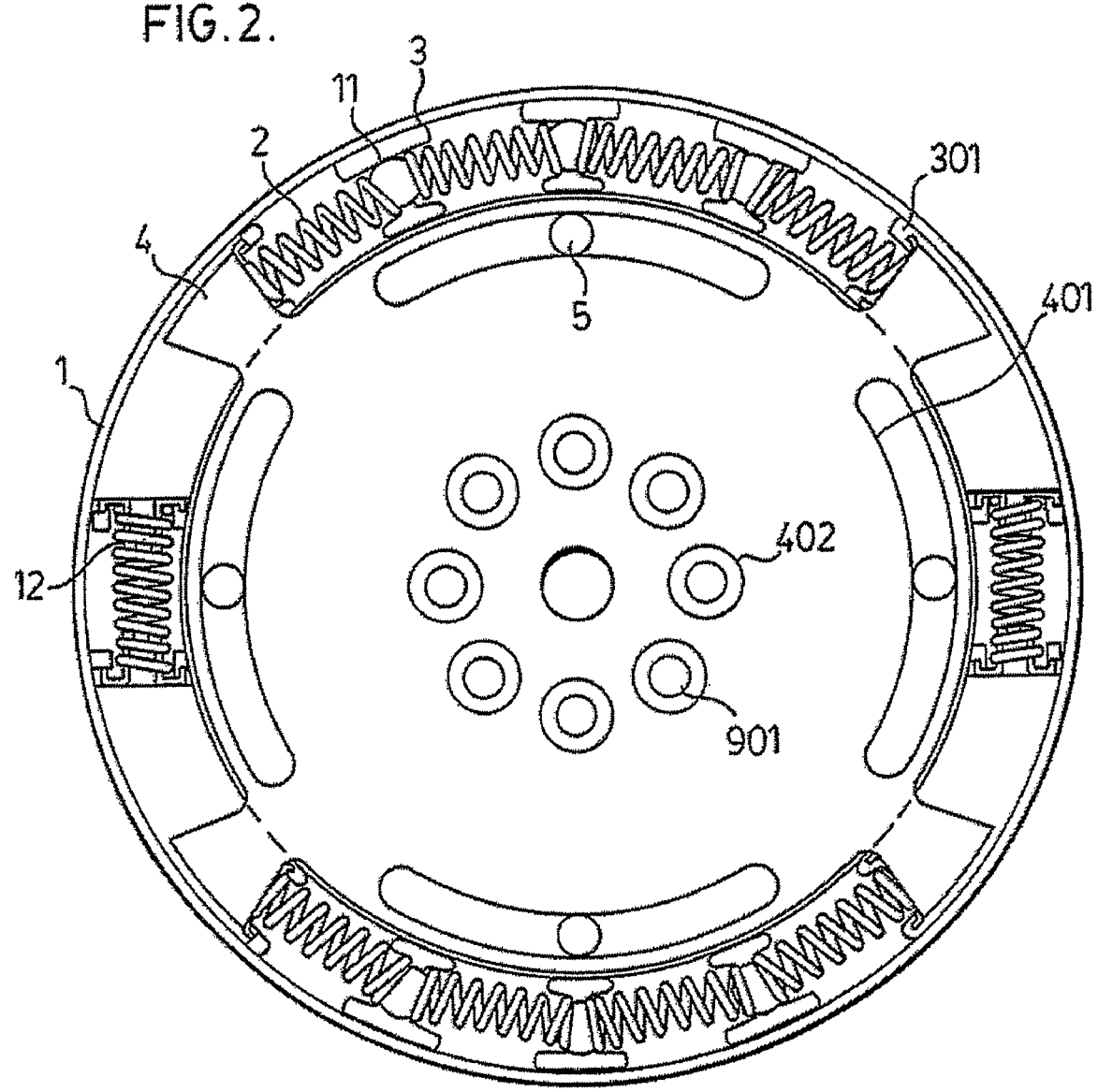
FIG. 2 is a top plan view of the damper assembly of FIG. 1.

The preferred configuration of the damper assembly 6 of the present invention is shown in FIG. 1 and FIG. 2. A damper assembly 6 is comprised of a torque input member 1, damping springs 2 and output member 4. In order to improve damper performances, some components may be added to the basic configuration. In this invention, the input member 1 is connected to engine crankshaft 13 through a torque limit clutch, which is mainly composed of friction plate 9, backing plate 10, and preloaded bellville spring or wave spring 8. Rivet pins 5 extend through apertures 105 and complete the damper assembly. The output member 4 is connected to the input shaft of a transmission through a hub 403 with internal spline 405. By compressing damping springs, the input member 1 and output member 4 can relatively rotate at some angular displacements before the input torque from engine crankshaft 13 is completely transmitted to transmission shaft 14. In this way, damping effect is produced, thus reducing impact, vibration and noise when a vehicle with such a damping device is accelerated or decelerated.

In order to reduce spring load force and improve spring fatigue life, as many damping springs 2 as required are arranged to be close to the damper outside diameter and those coil springs have to be circularly laid in circular spaces formed in the input member 1, as shown in FIG. 2.

Figure 3:
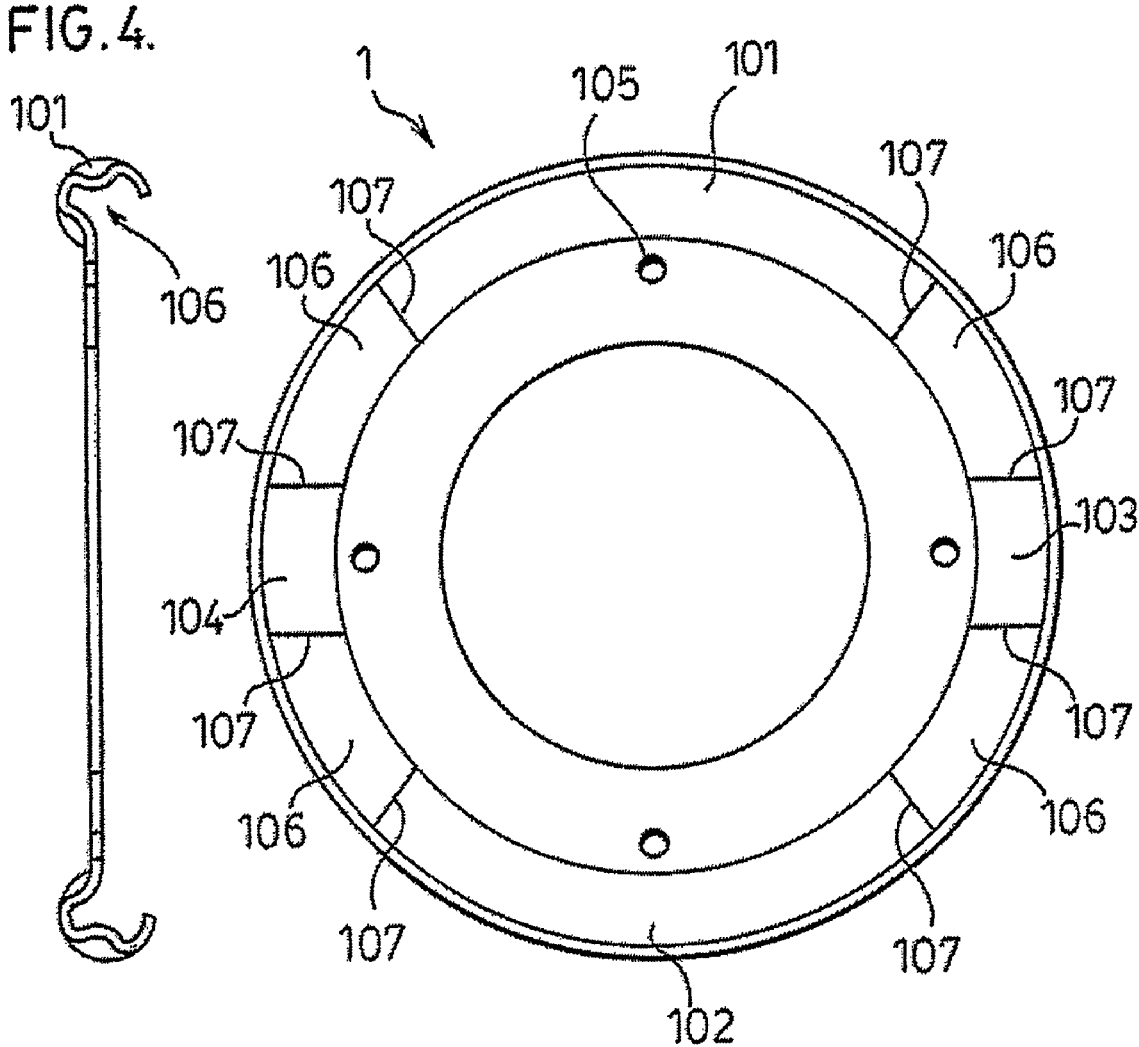
FIG. 3 is a top plan view of the friction plate of the damper assembly of FIG. 1.

Referring to FIG. 3, for the purpose of producing two stages of damping, four circular spaces 101 and 102, and 103 and 104 are formed. Two series of diametrically opposed springs are for first stage damping and two pairs of diametrically opposed springs are for second stage damping. Steps 107 in FIG. 3 are formed to take reaction load of damping springs when they are compressed between output member 4 and finger tab 404 shown in FIG. 4. Only when the series of springs are compressed to some degree, do the pair of springs start taking loads.

In some current production dampers, curved coil springs are developed for the circular spaces formed in input member 1. However, the costs are high for curved coil springs. In this invention, multiple short straight springs, preferably four in series, are used to replace curved springs. To reduce costs, all of the springs, both series and singular are the same length and coil diameter. A ball 11, preferably steel or synthetic material, such as NYLON or TORLON, is laid between each two straight coil springs. In this way, approximate circular layout is achieved as shown in FIG. 2. The length of the spring 2 relative to the radial extent of the circular spaces 101, 102, 103 and 104 must be selected to be sufficiently small so that the spring 2 will not compress out of alignment.

Referring FIGS. 2 and 4, four arcuate slots 401 are each in receipt of one pin 5 and are made to allow relative movement between input member 1 and output member 4. Eight clearance holes 402 are for the convenience of assembling the damper to engine crankshaft 13 with screw bolts 15.

Figure 7:
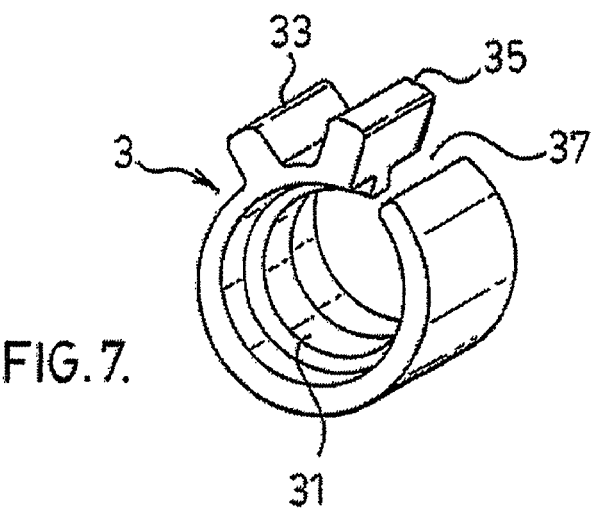
FIG. 7 is a perspective view spring and ball retainer of the damper assembly of FIG. 1.

Referring to FIG. 7, a spring and ball retainer 3 is illustrated in detail. The ball retainer 3 has a recess including an inner double tapered surface 31 that receives ball 11 in a snap fit and thus allows some rotational movement but prevents circumferential movement of the ball 11. As shown in FIG. 2, ball retainer 3 restricts ball 11 from contacting either of input member 1 and output member 4. Ball retainer 3 has a pair of radially extending tabs 33 and 35 that engage the edges of the rolled portion 106 of input member 1. Ball retainer 3 has a cut 37 and thus does not extend fully about the ball 11. With the ball 11 inserted in the ball retain 3, the ball 11 can receive two adjacent springs 2.

Figure 8:
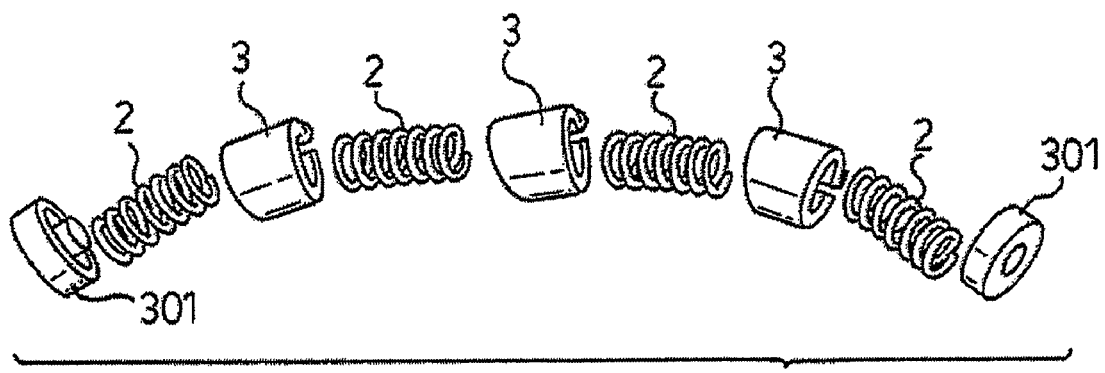
FIG. 8 is a perspective view of a series of springs of the damper assembly of FIG. 1.
Figure 9:
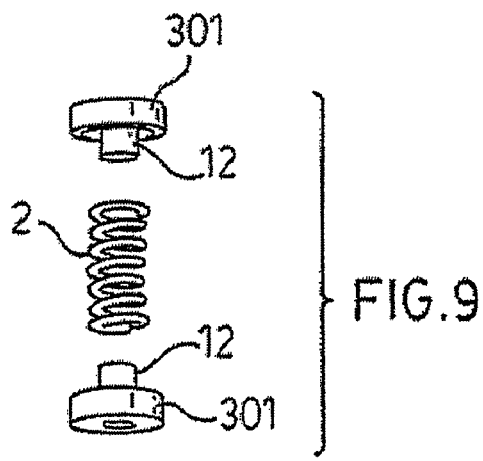
FIG. 9 is perspective view of an individual spring of the damper assembly of FIG. 1.

Referring to FIGS. 8 and 9, the end caps 301 are mounted at each end of the series of springs and the individual springs to present an engagement surface with steps 107 and finger tabs 404. The end caps 301 are cup shaped with a central spindle. Spring end cap 301 and ball retainer 3 are made of plastics, which reduce friction between springs 2 and input member 1. Component 12 is made of rubber and used to prevent springs 2 from being over compressed.

The damping springs 2, with retainers 3 and end caps 301 are inserted into the respective spaces 101, 102, 103 and 104 and then the outer periphery of the input member 1 is rolled to define rolled arcuate slots and retain the springs thereon. A method for undertaking this process is described in commonly assigned U.S. Pat. No. 6,675,457.

When the torque to be transmitted exceed a value predefined by pre-loaded belleville spring 8, the friction plate 9 will slid between backing plate 10 and input member 1. The friction plate 9 consists of stamped plate with friction material 901 being bonded.

The foregoing specific embodiments have been provided to illustrate the structural and functional principles of the present invention, and are not intended to be limiting. To the contrary, the present invention is intended to encompass all modifications, alterations, and substitutions within the scope of the appended claims.

What is claimed is:

1. A damper assembly comprising
   a torque input member configured to be connected to engine crankshaft through a torque limit clutch,
   an output member operatively engaging said input member for rotation therewith, said output member having a hub configured to be mounted to a transmission input shaft, and
   damping springs operatively interconnecting the input member and output member, enabling the input member and output member to rotate relative to each other while transmitting torque therebetween, said damping springs comprising a series of springs and an individual spring, wherein said series of springs compress before said individual spring compresses as said input member rotates relative to said output member, wherein said series of springs comprises a ball and a ball retainer operatively connecting adjacent ones of said series of springs, said ball retainer restricting said ball from contacting either of said input member and said output member.

2. A damper assembly according to claim 1, wherein said damping springs are retained on said input member in rolled arcuate slots.

3. A damper assembly according to claim 1, wherein opposite ends of said series of springs each has an end cap.

4. A damper assembly according to claim 3, wherein said individual spring has an end cap on each end thereof.

5. A damper assembly according to claim 4, wherein said damping springs are straight springs.

6. A damper assembly according to claim 5, wherein each of said damping springs is of the same length.

7. A damper assembly according to claim 6, wherein one of said input member and said output member has a pin and the other of said input member and said output member has an arcuate slot that receives said pin enabling limited relative rotation therebetween, said input member biased into frictional engagement with said output member to prevent the input member from rotating relative to the output member until a predefined amount of torque.

8. A damper assembly according to claim 7, wherein said damper assembly comprises at least two series of springs and at least two individual springs.

9. A damper assembly according to claim 8, wherein said two series of springs are positioned diametrically opposite to each other and said two individual springs are positioned diametrically opposite to each other.

10. A damper assembly according to claim 1, wherein said ball retainer includes a recess in receipt of said ball.

11. A damper assembly according to claim 10, wherein said ball is received within said recess in a snap-fit.

12. A damper assembly according to claim 10, wherein said recess includes a tapered surface.

* * * * *